United States Patent
Gasser et al.

(10) Patent No.: US 10,134,505 B2
(45) Date of Patent: Nov. 20, 2018

(54) SILICONE MULTILAYER INSULATION FOR ELECTRIC CABLE

(71) Applicant: NEXANS, Paris (FR)

(72) Inventors: Markus Gasser, Zullwil (CH); Franz Haner, Busserach (CH); Luc Romann, Bouxwiler (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/159,434

(22) Filed: May 19, 2016

(65) Prior Publication Data

US 2016/0343472 A1  Nov. 24, 2016

Related U.S. Application Data

(62) Division of application No. 13/975,560, filed on Aug. 26, 2013, now abandoned.

(51) Int. Cl.
 *B29C 47/02* (2006.01)
 *H01B 9/02* (2006.01)
 (Continued)

(52) U.S. Cl.
 CPC ......... *H01B 9/027* (2013.01); *B29C 47/0016* (2013.01); *B29C 47/025* (2013.01); *B29C 47/065* (2013.01); *B29C 47/56* (2013.01); *B32B 15/06* (2013.01); *B32B 25/042* (2013.01); *B32B 25/20* (2013.01); *H01B 3/46* (2013.01); *H01B 13/141* (2013.01); *H01B 13/143* (2013.01);
 (Continued)

(58) Field of Classification Search
 CPC ...... H01B 3/46; H01B 13/141; H01B 13/143; B29C 47/0016; B29C 47/025; B29C 47/065; B29C 47/56; B29C 47/265; B32B 15/06; B32B 25/042; B32B 25/20; B29K 2083/00; B29K 2105/16; B29K 2507/04; B29K 2995/0005; B29K 2995/0007; B29K 2250/248; B29K 2264/108; B29K 2307/206
 USPC ............... 174/110 R–110 PM, 120 R, 121 R, 174/120 SC, 121 SC; 264/135, 136, 174, 264/257
 See application file for complete search history.

(56) References Cited

U.S. PATENT DOCUMENTS 5,002,712 A * 3/1991 Goldmann ............ B29B 15/122
 264/136
6,455,771 B1 * 9/2002 Han ........................ C08L 23/08
 174/106 R
(Continued)

FOREIGN PATENT DOCUMENTS

GB 870583 6/1961
JP 61029521 2/1986
(Continued)

OTHER PUBLICATIONS

Search Report dated Mar. 12, 2013.

*Primary Examiner* — William H Mayo, III
(74) *Attorney, Agent, or Firm* — Sofer & Haroun, LLP

(57) ABSTRACT

A cable has at least one elongated electric conductor and a multilayer insulation surrounding the electric conductor. The multilayer insulation has a first semiconducting layer and an electrically insulating layer. The two layers are made from a silicone rubber based composition. A method for making this cable includes co-extruding the first semiconducting layer and the electrically insulating layer.

10 Claims, 2 Drawing Sheets

(51) Int. Cl.
*H01B 13/14* (2006.01)
*B29C 47/56* (2006.01)
*H01B 3/46* (2006.01)
*B29C 47/00* (2006.01)
*B29C 47/06* (2006.01)
*B32B 15/06* (2006.01)
*B32B 25/04* (2006.01)
*B32B 25/20* (2006.01)
*B29C 47/26* (2006.01)
*B29K 83/00* (2006.01)
*B29K 105/16* (2006.01)
*B29K 507/04* (2006.01)

(52) U.S. Cl.
CPC ........ *B29C 47/265* (2013.01); *B29K 2083/00* (2013.01); *B29K 2105/16* (2013.01); *B29K 2507/04* (2013.01); *B29K 2995/0005* (2013.01); *B29K 2995/0007* (2013.01); *B32B 2250/248* (2013.01); *B32B 2264/108* (2013.01); *B32B 2307/206* (2013.01)

(56) References Cited

U.S. PATENT DOCUMENTS

| | | | | |
|---|---|---|---|---|
| 6,524,702 | B1* | 2/2003 | Betso | H01B 3/441 |
| | | | | 174/110 PM |
| 6,565,779 | B1* | 5/2003 | Kharazi | H01B 1/24 |
| | | | | 264/105 |
| 6,797,886 | B1* | 9/2004 | Gustafsson | H01B 3/441 |
| | | | | 174/110 R |
| 9,196,394 | B2* | 11/2015 | Jeker | H01B 1/24 |
| 2002/0047268 | A1* | 4/2002 | Leijon | H01F 3/10 |
| | | | | 290/7 |
| 2004/0020681 | A1* | 2/2004 | Hjortstam | B82Y 30/00 |
| | | | | 174/102 SC |
| 2005/0064177 | A1* | 3/2005 | Lee | B82Y 10/00 |
| | | | | 428/323 |
| 2006/0182961 | A1* | 8/2006 | Person | B82Y 30/00 |
| | | | | 428/364 |

FOREIGN PATENT DOCUMENTS

| | | | | |
|---|---|---|---|---|
| JP | 11-19999 A | * | 1/1999 | ............ B29C 47/06 |
| WO | WO2012048927 | | 4/2012 | |

* cited by examiner

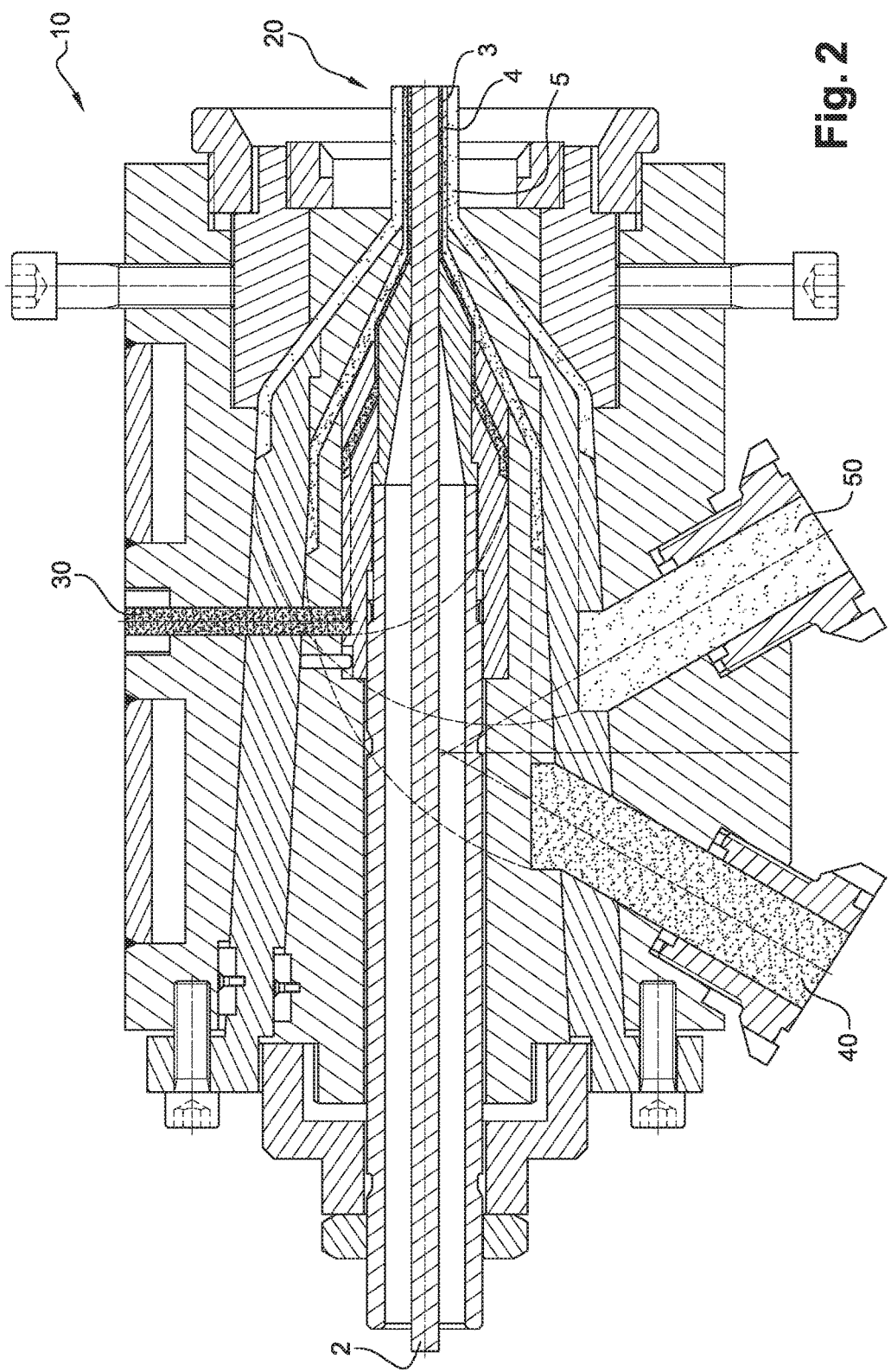

SILICONE MULTILAYER INSULATION FOR ELECTRIC CABLE

RELATED APPLICATION

This application is a divisional application of U.S. patent application Ser. No. 13/975,560, filed on Aug. 26, 2013 which in turn claims the benefit of priority from European Patent Application No. 12 306 158.2, filed on Sep. 25, 2012, the entirety of which are incorporated by reference.

BACKGROUND

Field of the Invention:

The present invention relates to an electric cable including a multilayer insulation made from silicone rubber, as well as a manufacturing process of said electric cable.

More particularly, it applies typically, but not exclusively, to the fields of power cables, such as medium voltage (especially from 5 kV to 45-60 kV) or high voltage (especially greater than 60 kV, which may be up to 800 kV) power cables, whether they are direct voltage (DC) or alternative voltage (AC) cables.

Description of Related Art:

Medium voltage or high voltage power cables typically comprise a central electric conductor and, successively and coaxially around this electric conductor, a semiconducting inner layer, an electrically insulating (intermediate) layer and a semiconducting outer layer. These three layers can be crosslinked via techniques that are well known to those skilled in the art.

GB 870 583 describes a 3-layer insulation for an electric cable, comprising a semiconducting inner layer, an electrically insulating (intermediate) layer and a semiconducting outer layer. Said three layers are made from vinyl-containing silicone gum, and are extruded successively around an electric conductor to form said 3-layer insulation.

However, this process is not optimized to reduce significantly partial discharges between the electrical insulating layer and the semiconducting layers, when a voltage level of at least 5 kV is applied to the electric cable.

OBJECTS AND SUMMARY

The aim of the present invention is to overcome the drawbacks of the prior art by proposing an electric cable comprising:
  at least one elongated electric conductor, and
  a multilayer insulation surrounding said electric conductor, said multilayer insulation comprising a first semiconducting layer and an electrically insulating layer, said two layers being made from a silicone rubber based composition,
characterized in that the first semiconducting layer and the electrically insulating layer are co-extruded layers, and more particularly are obtained by a co-extrusion process.

The coextruded multilayer insulation allows advantageously to remove the presence of gas and/or the presence of space between the extruded layers of the insulation.

Hence, the multilayer insulation of the present invention allows advantageously to decrease partial discharges in the electric cable, while guaranteeing good flexibility properties.

The term "co-extruded layers" means that the extrusion of the layers of the multilayer insulation may occur simultaneously, more particularly in using the same extrusion head (i.e. only one extruder head).

In a preferred embodiment, the first semiconducting layer can surround the elongated electric conductor, and said electrically insulating layer can surround the first semiconducting layer.

In another preferred embodiment, the multilayer insulation can comprise a second semiconducting layer made from a silicone rubber based composition, to form a 3-layer insulation, so that the first semiconducting layer, the electrically insulating layer and the second semiconducting layer are co-extruded layers. More particularly, the first semiconducting layer can be surrounded by the electrically insulating layer, and the electrically insulating layer can be surrounded by the second semiconducting layer.

The silicone rubber (i.e. silicone gum) used in the present invention is an elastomer (rubber-like material) composed of silicone polymer containing silicon together with carbon, hydrogen, and oxygen. The silicone rubber is usually named as polysiloxane, and more particularly a polyorganosiloxane.

More particularly, the backbone of the silicone rubber comprises Si—O—Si units.

The silicone rubber based composition may comprise more than 50.0 parts by weight of silicone rubber per 100 parts by weight of polymer(s) (i.e. polymer matrix) in the composition, preferably at least 70 parts by weight of silicone rubber per 100 parts by weight of polymer(s) in said composition, and particularly preferably at least 90 parts by weight of silicone rubber per 100 parts by weight of polymer(s) in said composition.

In a particularly advantageous manner, the silicone rubber based composition comprises a polymer matrix that is composed solely of a silicone rubber or a mixture of silicone rubbers. One thus talks about silicone rubber matrix as such.

The composition used to obtain the first and/or the second semiconducting layers of the present invention, also comprise at least one (electrically) conductive filler, in an amount that is sufficient to make semiconducting the silicone rubber based composition.

In addition, the amount of conductive filler in the silicon rubber based composition should preferably allow the composition to be extruded.

It is more particularly considered that a layer is semiconducting when its specific electric conductivity is at most of $1 \cdot 10^9$ Ωm (ohm centimeter).

The silicone rubber based composition used to obtain a semiconducting layer may comprise at most 60% by weight of (electrically) conductive filler, preferably at most 50% by weight of conductive filler, preferably at most 40% by weight of conductive filler.

In another embodiment, the silicone rubber based composition used to obtain a semiconducting layer may comprise at least 0.1% by weight of (electrically) conductive filler, preferably at least 10% by weight of conductive filler, and even more preferentially at least 20% by weight of conductive filler.

The conductive filler may be advantageously chosen from carbon blacks, conductive carbon, and metal particles, or one of their mixtures.

The conductive carbon blacks can be selected from any of the carbon blacks listed in ASTM D-1765-76, furnace black, acetylene black, thermal black, lamb black and Ketjen black, or one of their mixtures.

The conductive carbon, as distinguished from conductive carbon black, includes at least one of carbon fiber, carbon nanotubes, fullerene, grapheme, graphites and expanded graphite platelets. The average particle size of such conductive carbon can typically be of nano-scale proportions.

The preferred carbon fibers used in the invention are carbon rovings, which are more particularly bundles of carbon fibers. The use of carbon rovings allow advantageously to decrease in a more significant manner partial discharges in the electric cable.

In a particular embodiment, the carbon rovings can include a first type of carbon rovings with a first length, and/or a second type of carbon rovings with a second length, the first length being more particularly different from the second length.

In a preferred embodiment, the carbon rovings includes said first type of carbon rovings with a first length, and said second type of carbon rovings with a second length. The second length can be at least ten times superior to the first length.

The carbon rovings can be cut to obtain the desired length.

The first length of the first type of carbon rovings can go from 50 to 300 μm, and more preferably can be around 220 μm.

The second length of the second type of carbon rovings can go from 1 to 10 mm, and more preferably can go from 3 to 6 mm.

The composition can comprises at least 2% by weight of the first type of carbon rovings and/or at least 10% by weight of the second type of carbon rovings.

The conductive filler of the present invention can only be carbon rovings, or a mixture of carbon rovings with other type(s) of conductive filler(s).

The conductive metal particles include granules, powder, fibers, platelets, and the like. These metal particles typically have an average particle size of 0.1 to 100, more typically 0.3 to 30, microns as measured by X-ray line broadening. The metal particles may have any particle shape desired although, as is known, the shape selection may depend upon the intended end use of the metal-filled product. Spherical shapes, platelets, prismatic shapes, whiskers, and the like, can be used.

Metals that can be used as a conductive filler include, alone or in admixture with one or more other such metals, or as finely powdered alloys, aluminum, indium, tin, lead, bismuth, as well as Groups II-B through VII-B elements of the Periodic System including such as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, and the like. Particularly satisfactory for convenience and relative cheapness are aluminum, zinc, iron, nickel, tin, lead, and silver. Copper, while conductive, may in its metallic form be objectionable in some rubber compounding formulations.

The silicone rubber based composition(s) of the present invention can be crosslinkable (i.e. vulcanizable) silicone rubber based composition(s).

In a particular embodiment of the invention, at least one layer of the multilayer insulation, more preferably at least two layers of the multilayer insulation, and more preferably the layers (i.e. the first semiconducting layer and the electrically insulating layer, or the first semiconducting layer, the electrically insulating layer, and the second semiconducting layer) of the multilayer insulation, is/are crosslinked layer(s) (i.e. vulcanized layer(s)).

In this respect, the silicone rubber based composition of the invention may be crosslinked by process well-known in the art to crosslink silicone rubber, such as for example in using peroxides, sulfur systems, metallic oxides, etc According to peroxide crosslinking, the silicone rubber based composition can further comprise organic peroxide, and more particularly not more than 2.00 parts by weight of organic peroxide per 100 parts by weight of polymer(s) in the composition.

Other additives and/or fillers that are well known to those skilled in the art may also be added to the silicone rubber based composition of the invention, such as breakdown retardants; processing aids such as lubricants or waxes; compatibilizers; couplers; UV stabilizers; and/or non-conductive fillers.

In one particular embodiment, when the multilayer insulation is the 3-layer insulation, the multilayer insulation is designed so that the electrically insulating layer is directly in physical contact with the first semiconducting layer, and the second semiconducting layer is directly in physical contact with the electrically insulating layer.

In a preferred embodiment according to the present invention, the multilayer insulation is surrounded by a metal shield.

Said metal shield is arranged around and along the multilayer insulation.

This metal shield may be:
 a "wire" shield, composed of an assembly of copper or aluminum conductors surrounding the second semiconducting layer,
 a "strip" shield composed of one or more conducting metal strips laid spirally around the second semiconducting layer, or
 a "leaktight" shield such as a metal tube surrounding the second semiconducting layer. This latter type of shield makes it possible especially to form a barrier to the moisture that has a tendency to penetrate the electric cable in the radial direction.

Combining with the co-extruded multilayer insulation, the metal shield of the present invention allows advantageously to decrease in a more significant manner partial discharges in the electric cable.

The metal shield may as well serve for earthing the electric cable and may thus transport fault currents, for example in the case of a short-circuit in the network concerned.

Finally, thanks to the metal shield, the electric cable can be placed everywhere, for example on a metallic ground, so that it render the electric cable easy to install and to use.

Furthermore, the electric cable of the invention may comprise an outer protective sheath surrounding the multilayer insulation, or alternatively more particularly surrounding said metal shield, when it exists. This outer protective sheath may be conventionally made from suitable thermoplastic materials such as HDPE, MDPE or LLDPE; or alternatively flame-propagation-retardant materials or fire-propagation-resistant materials. In particular, if the latter materials do not contain halogen, this sheath is referred to as being of HFFR type (Halogen Free Flame Retardant).

Other layers, such as layers that swell in the presence of moisture, may be added between the multilayer insulation and the metal shield when it exists, and/or between the metal shield and the outer sheath when they exist, these layers providing longitudinal and/or transverse leaktightness of the electric cable to water. The electric conductor of the cable of the invention may also comprise materials that swell in the presence of moisture to obtain a "leaktight core".

The electric cable of the present invention can be more particularly a power cable supporting a voltage level of at least 5 kV. It can be a direct voltage (DC) or alternative voltage (AC) cable.

More preferably, the electric cable can support a voltage level from 5 kV to 45-60 kV for medium voltage cable, or a voltage level greater than 60 kV, which may be up to 800 kV, for high voltage cable.

Another object of the present invention is a process for manufacturing the electric cable as described in the present invention, characterized in that the process comprises the step of co-extruding the layers (i.e. the first semiconducting layer and the electrically insulating layer, or the first semiconducting layer, the electrically insulating layer, and the second semiconducting layer) of the multilayer insulation according to the invention.

More particularly, the layers of the multilayer insulation can be extruded simultaneously.

More preferably, the simultaneous extrusion can be done with the same extrusion head.

To co-extrude the compositions aiming at forming respectively the different layers of the multilayer insulation of the electric cable of the invention, said compositions are extruded in using one extruder per composition in order to flow until the same extrusion head in which said compositions are gathered to be co-extruded.

BRIEF DESCRIPTION OF DRAWINGS

Other characteristics and advantages of the present invention will emerge in the light of the description of non-limiting examples, given with reference to figures according to the invention, wherein:

FIG. 2 shows an extrusion head to co-extrude a multilayer insulation to form an electric cable according to the invention.

DETAILED DESCRIPTION

Figure 1:
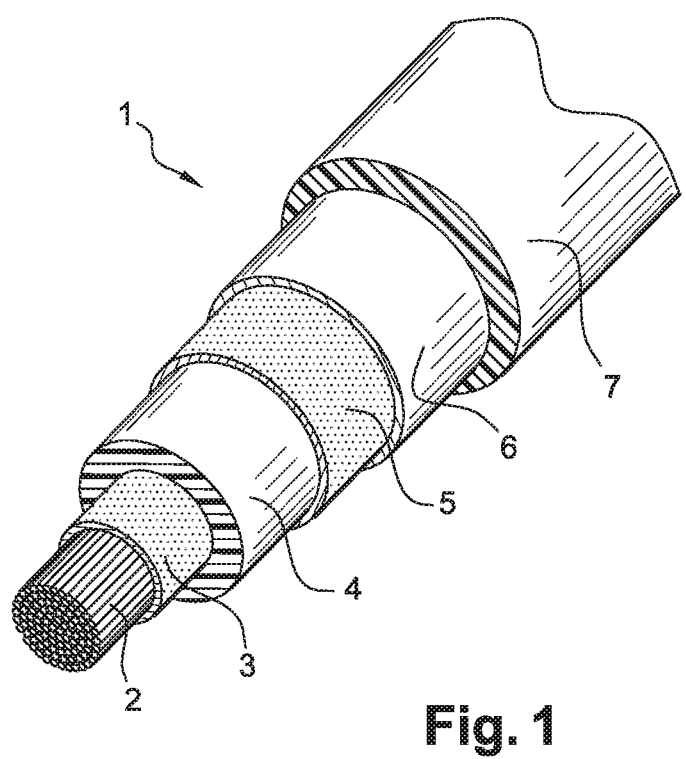
FIG. 1 shows a schematic view in perspective and in cross section of an electric cable according to the invention.

For reasons of clarity, only the elements that are essential for understanding the invention have been schematically represented, and without being drawn to scale.

The power cable 1, illustrated in FIG. 1, comprises an elongated central conducting element 2, especially made of copper or aluminum. Successively and coaxially around this conducting element 2, the power cable 1 also comprises a first semiconducting layer 3 known as the "inner semiconducting layer", an electrically insulating layer 4, a second semiconducting layer 5 known as the "outer semiconducting layer", a metal shield 6, and an outer protective sheath 7, the three layers 3, 4 and 5 being co-extruded layers according to the invention. The presence of the metal shield 6 is preferential. The presence of the protective outer sheath 7 is preferential, but not essential.

The co-extrusion process of the layers 3, 4 and 5 of FIG. 1 is illustrated in FIG. 2.

FIG. 2 shows the co-extrusion process of:
a first silicone rubber semiconducting composition 30, commercialized by the company MESGO under the reference MG1414N60P, said first silicone rubber semiconducting composition comprising around 40-50% by weight of carbon black as conductive filler;
a silicone rubber electrically insulation composition 40, commercialized by the company RADO under the reference Silopren 2270H; and
a second silicone rubber semiconducting composition 50, commercialized by the company MESGO under the reference MG1414N60P, said second silicone rubber semiconducting composition comprising around 40-50% by weight of carbon black as conductive filler.

Said three compositions 30, 40 and 50 flow respectively from three different extruders (not represented) to the inside of an extrusion head 10.

The three different extruders may be extruders well-known in the art.

The extruder head 10 is commercialized by the company under ITAL under the reference TECA/35, used for three-layer extrusion.

In said extruder head 10, said three compositions 30, 40 and 50 go through the same extrusion head extremity 20.

In said extrusion head extremity 20, the compositions 30, 40 and 50 are applied simultaneously around the elongated central conducting element 2, to form respectively the coextruded layers 3, 4 and 5 around said elongated central conducting element.

Hence, there is substantially no air bubble between the interface of the layers 3 and 4, and between the interface of the layers 4 and 5, so that said 3-layer insulation allows advantageously to decrease partial discharges in the electric cable, while guaranteeing good flexibility properties.

The invention claimed is:

1. Process for manufacturing an electric cable,
the electric cable has at least one elongated electric conductor; and
a multilayer insulation surrounding said electric conductor,
wherein said multilayer insulation having a first semiconducting layer and an electrically insulating layer, said two layers being made from a silicone rubber based composition,
said method comprising the step of;
co-extruding the first semiconducting layer and the electrically insulating layer, wherein the composition used to obtain the first semi-conducting layer further comprises carbon rovings as conductive filler.

2. Process according to claim 1, wherein the multilayer insulation has a second semiconducting layer made from a silicone rubber based composition, to form a 3-layer insulation, so that the first semiconducting layer, the electrically insulating layer and the second semiconducting layer are co-extruded layers.

3. Process according to claim 2, wherein the first semiconducting layer is surrounded by the electrically insulating layer, and the electrically insulating layer is surrounded by the second semiconducting layer.

4. Process according to claim 1, wherein at least one of the layers of said multilayer insulation is a crosslinked layer.

5. Process according to claim 1, wherein the multilayer insulation is surrounded by a metal shield.

6. Process according to claim 1, wherein the electric cable is a power cable supporting a voltage level of at least 5 kV.

7. Process according to claim 1, wherein the layers of the multilayer insulation are extruded simultaneously.

8. Process according to claim 1, wherein the co-extrusion is done with the same extrusion head.

9. Process according to claim 4, wherein the layers of said multilayer insulation are crosslinked layers.

10. Process for manufacturing an electric cable, the electric cable has at least one elongated electric conductor; and a multilayer insulation surrounding said electric conductor, wherein said multilayer insulation having a first semiconducting layer and an electrically insulating layer, said two layers being made from a silicone rubber based composition, said method comprising the step of;

co-extruding the first semiconducting layer and the electrically insulating layer, so that the presence of gas and/or the presence of space between the extruded layers are substantially removed, wherein the composition used to obtain the first semiconducting layer further comprises carbon rovings as conductive filler.

\* \* \* \* \*